United States Patent
Lyuh et al.

(10) Patent No.: US 10,154,225 B2
(45) Date of Patent: Dec. 11, 2018

(54) FRAME GRABBER, IMAGE PROCESSING SYSTEM INCLUDING THE SAME, AND IMAGE PROCESSING METHOD USING THE FRAME GRABBER

(71) Applicant: ELECTRONICS AND TELECOMMUNICATIONS RESEARCH INSTITUTE, Daejeon (KR)

(72) Inventors: Chun-Gi Lyuh, Daejeon (KR); Yi-Gyeong Kim, Daejeon (KR); Jung Hee Suk, Daejeon (KR); Young-Deuk Jeon, Daejeon (KR); Min-Hyung Cho, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 13 days.

(21) Appl. No.: 15/653,358

(22) Filed: Jul. 18, 2017

(65) Prior Publication Data

US 2018/0146155 A1  May 24, 2018

(30) Foreign Application Priority Data

Nov. 18, 2016 (KR) .................. 10-2016-0154415
Mar. 29, 2017 (KR) .................. 10-2017-0040277

(51) Int. Cl.
*H04N 5/44* (2011.01)
*H04N 19/44* (2014.01)
(Continued)

(52) U.S. Cl.
CPC ............. *H04N 5/4448* (2013.01); *H04N 5/05* (2013.01); *H04N 19/44* (2014.11); *H04N 5/23238* (2013.01)

(58) Field of Classification Search
CPC .......... H04N 5/05; H04N 5/44; H04N 5/4448; H04N 5/23238; H04N 19/44
(Continued)

(56) References Cited

U.S. PATENT DOCUMENTS 5,822,460 A * 10/1998 Kim ..................... H04N 19/649
                                                        375/E7.081
5,959,672 A *  9/1999 Sasaki ................. H04N 19/503
                                                        375/240.14
(Continued)

FOREIGN PATENT DOCUMENTS

KR       20-0311059 Y1     4/2003
KR    10-2003-0052446 A    6/2003
(Continued)

*Primary Examiner* — Michael Lee

(57) ABSTRACT

The present disclosure relates to a frame grabber, an image processing system, and an image processing method. A frame grabber according to an embodiment of the inventive concept includes a plurality of decoders, a plurality of image controllers, a plurality of memories, a synchronization controller, and a synchronization memory. The plurality of decoders generate a plurality of image data by decoding a plurality of image signals. The plurality of image controllers generate a plurality of pixel data and a plurality of frame information data on the basis of the plurality of image data. The plurality of memories store the plurality of pixel data. The synchronization controller receives the plurality of frame information data, and generates synchronization data on the basis of the plurality of frame information data. The synchronization memory stores the frame information data and the synchronization data.

18 Claims, 8 Drawing Sheets

(51) Int. Cl.
*H04N 5/05* (2006.01)
*H04N 5/232* (2006.01)

(58) Field of Classification Search
USPC ....... 348/571, 500, 512, 513, 521, 523, 525,
348/526, 540, 564, 567, 425.4, 492,
348/207.1, 211.11, 222.1, 231.1, 231.6,
348/231.9, 139, 143, 153, 159, 169, 194,
348/73, 51, 50, 49, 48, 47, 43, 706, 714,
348/716, 719, 723, 725; 345/1.1, 173,
345/213, 545, 546, 558, 567, 698
See application file for complete search history.

(56) References Cited

U.S. PATENT DOCUMENTS

| | | | |
|---|---|---|---|
| 6,307,885 B1* | 10/2001 | Moon | H04N 19/61 375/240.08 |
| 6,791,602 B1 | 9/2004 | Sasaki et al. | |
| 8,917,314 B2 | 12/2014 | Yun et al. | |
| 9,189,857 B2 | 11/2015 | Yoon et al. | |
| 2002/0152557 A1* | 10/2002 | Elberbaum | A61K 8/8147 8/405 |
| 2003/0156092 A1* | 8/2003 | Suzuki | G09G 3/3685 345/98 |
| 2004/0046706 A1 | 3/2004 | Lim et al. | |
| 2005/0093990 A1 | 5/2005 | Aoyama | |
| 2009/0179997 A1* | 7/2009 | Lin | H04N 5/772 348/222.1 |
| 2011/0052137 A1* | 3/2011 | Cowie | H04N 5/232 386/207 |
| 2014/0218323 A1* | 8/2014 | Hung | G06F 3/0416 345/173 |
| 2016/0080645 A1* | 3/2016 | Ohba | H04N 5/23229 348/207.11 |

FOREIGN PATENT DOCUMENTS

| | | |
|---|---|---|
| KR | 10-0414159 B1 | 1/2004 |
| KR | 10-1412513 B1 | 6/2014 |

* cited by examiner

FRAME GRABBER, IMAGE PROCESSING SYSTEM INCLUDING THE SAME, AND IMAGE PROCESSING METHOD USING THE FRAME GRABBER

CROSS-REFERENCE TO RELATED APPLICATIONS

This U.S. non-provisional patent application claims priority under 35 U.S.C. § 119 of Korean Patent Application Nos. 10-2016-0154415, filed on Nov. 18, 2016, and 10-2017-0040277, filed on Mar. 29, 2017, the entire contents of which are hereby incorporated by reference.

BACKGROUND

The present disclosure herein relates to synchronization of images provided from a plurality of cameras, and more particularly, to a frame grabber, an image processing system including the same, and an image processing method using the frame grabber.

A frame grabber represents an apparatus for converting an analog image signal received from a camera or the like into digital image data processable by an electronic device. The frame grabber receives an image signal on a frame-by-frame basis, and stores, in a memory, image data based on the received image signal.

It has been required to develop vehicles which enable users to view the periphery of a vehicle, such as the front, the rear, and the sides of the vehicle, through a single screen to provide convenience to the users. Furthermore, smart cars or advanced driver assistance systems (ADASs) are attracting great attention, in which image recognition algorithms for recognizing surrounding objects are used to enable autonomous driving. A plurality of cameras may be arranged in a vehicle to monitor the periphery of the vehicle. The cameras may monitor in different directions, and may provide a plurality of image signals to a frame grabber.

In the case where a frame grabber receives a plurality of image signals from a plurality of cameras, it is important to synchronize the image signals or image data. When the image signals or the image data are not synchronized, it is difficult to secure the stability and the accuracy of an image since the image is distorted. Therefore, for the case where a frame grabber receives a plurality of image signals from a plurality of cameras, a frame grabber which minimizes a synchronization error is required.

SUMMARY

The present disclosure provides a frame grabber capable of efficiently synchronizing images received from a plurality of cameras without providing a synchronization signal to the plurality of cameras, an image processing system including the frame grabber, and an image processing method using the frame grabber.

An embodiment of the inventive concept provides a frame grabber including a plurality of decoders, a plurality of image controllers, a plurality of memories, a synchronization controller, a synchronization memory, and a processor. The plurality of decoders generate a plurality of image data by decoding a plurality of image signals. The plurality of image controllers generate a plurality of pixel data and a plurality of frame information data on the basis of the plurality of image data. The plurality of memories store the plurality of pixel data.

The synchronization controller receives the plurality of frame information data, and generates synchronization data on the basis of the plurality of frame information data. The synchronization controller provides an interrupt signal to the processor. The synchronization controller may include a counter which increase a counter value while the plurality of frame information data are not received. The counter may reset the counter value when the plurality of frame information data are received.

The synchronization controller may generate the synchronization data after elapse of a reference time since reception of the plurality of frame information data. The synchronization controller may generate the synchronization data when the counter value is equal to or larger than a reference value. The synchronization controller may further include a synchronization information register which increases a synchronization information register value when the counter value is equal to or larger than a reference value. The synchronization memory sequentially stores the plurality of frame information data and the synchronization data, and provides the plurality of frame information data and the synchronization data to the processor in order in which the plurality of frame information data and the synchronization data were stored.

The processor receives the plurality of frame information data and the synchronization data stored in the synchronization memory, on the basis of the interrupt signal. The processor receives the plurality of pixel data from the memory on the basis of the plurality of frame information data. The processor synchronizes the plurality of pixel data on the basis of the synchronization data.

In an embodiment of the inventive concept, an image processing system includes a plurality of cameras, a decoder, an image controller, a memory, a synchronization controller, a synchronization memory, and a processor. The plurality of cameras detect images and generate a plurality of image signals. The plurality of image signals may be provided to the decoder via transfer paths having different lengths. The image processing system may further include a camera synchronization signal generation unit which provides a synchronization signal to the plurality of cameras and is separated from the synchronization controller.

The decoder may include a plurality of decoders which decode an image signal corresponding to one of the plurality of cameras. The image controller may include a plurality of image controllers which receive image data corresponding to one of the plurality of cameras, and generate pixel data and frame information data. The memory may include a plurality of memories which store pixel data corresponding to one of the plurality of cameras. The processor may determine a memory for performing a read operation among the plurality of memories on the basis of the plurality of frame information data.

In an embodiment of the inventive concept, an image processing method using a frame grabber includes: generating a plurality of image data; generating a plurality of pixel data and a plurality of frame information data; storing the plurality of pixel data; generating synchronization data; and synchronizing the plurality of pixel data.

The generating the synchronization data may include, for example, increasing a counter value until a synchronization controller receives the plurality of frame information data, resetting the counter value when the synchronization controller receives the plurality of frame information data, and providing the synchronization data to a synchronization memory when the counter value is equal to or larger than a reference value.

The generating the synchronization data may include, for example, increasing a counter value until a synchronization controller receives the plurality of frame information data, providing, to a synchronization memory, the synchronization data including counter information corresponding to the counter value when the synchronization controller receives the plurality of frame information data, and resetting the counter value.

The generating the synchronization data may include, for example, increasing a counter value until a synchronization controller receives the plurality of frame information data, generating the synchronization data including register information corresponding to a synchronization information register value when the synchronization controller receives the plurality of frame information data, and increasing the synchronization information register value when the counter value is equal to or larger than a reference value.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described in detail and clearly so that the present invention can be easily carried out by those skilled in the art.

Figure 1:
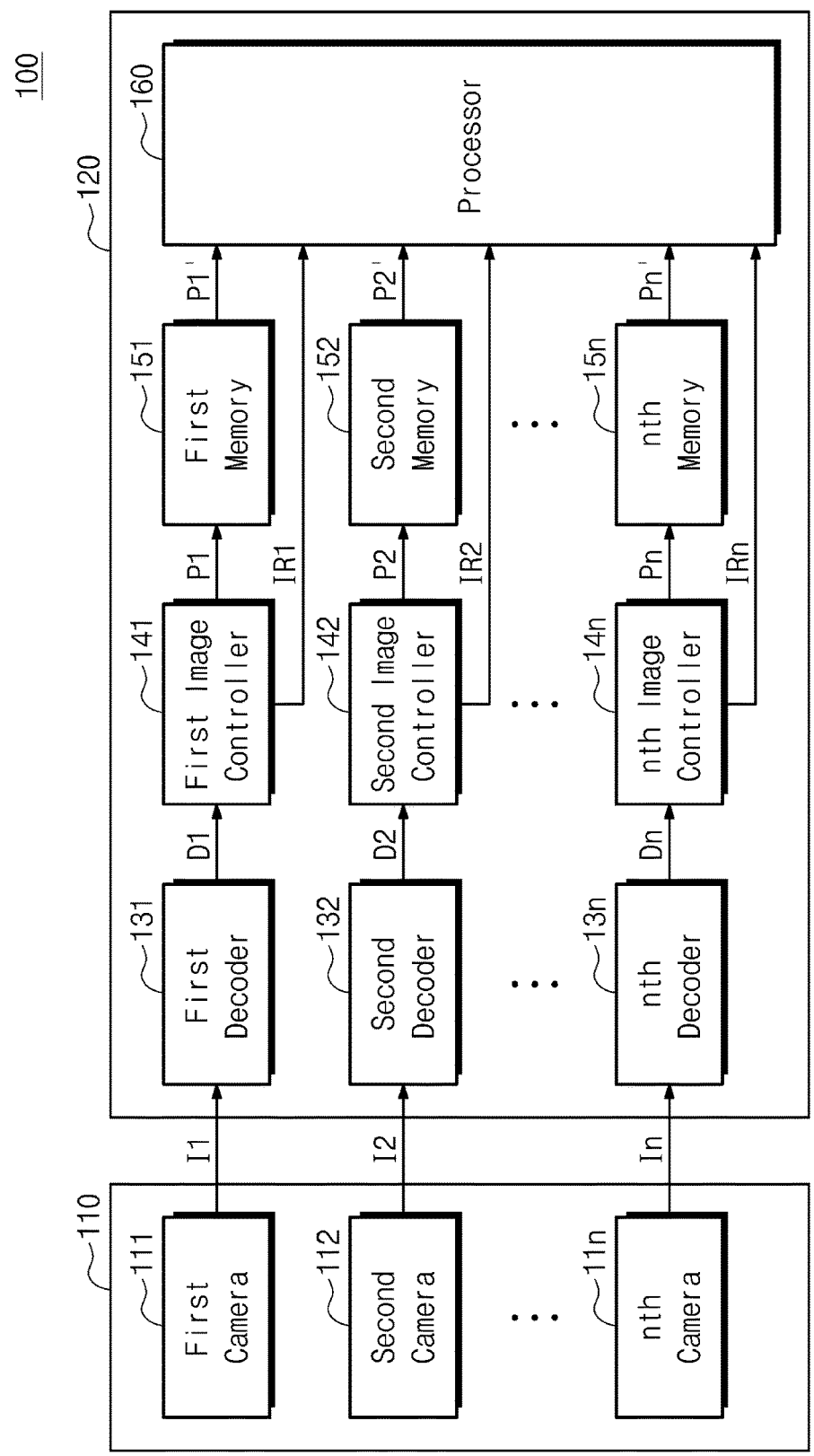
FIG. 1 is a block diagram illustrating an image processing system.

FIG. 1 is a block diagram illustrating an image processing system. Referring to FIG. 1, an image processing system 100 includes a camera unit 110 and a frame grabber 120. The camera unit 110 includes a plurality of cameras. The camera unit 110 includes first to nth cameras 111 to 11$n$. The frame grabber 120 includes first to nth decoders 131 to 13$n$, first to nth image controllers 141 to 14$n$, first to nth memories 151 to 15$n$, and a processor 160.

The camera unit 110 detects an image. The camera unit 110 generates a plurality of image signals on the basis of the detected image. The first to nth cameras 111 to 11$n$ generate first to nth image signals I1 to In respectively. The first to nth image signals I1 to In may be simultaneously generated. For example, the first to nth cameras 111 to 11$n$ may simultaneously captures images in different directions. A single panorama image may be displayed to a user on the basis of the images simultaneously captured by the first to nth cameras 111 to 11$n$.

The first to nth decoders 131 to 13$n$ receive the first to nth image signals I1 to In from the camera unit 110. The number of the decoders may be equal to the number of the cameras included in the camera unit 110. In this case, the decoders receive image signals from corresponding cameras. The first decoder 131 may receive the first image signal I1 from the first camera 111, and the second decoder 132 may receive the second image signal I2 from the second camera 112.

The first to nth decoders 131 to 13$n$ decode the first to nth image signals I1 to In. The first to nth decoders 131 to 13$n$ convert the first to nth image signals I1 to In, which are analog signals, into digital signals, i.e., first to nth image data D1 to Dn. Each of the first to nth image data D1 to Dn may include at least one of pixel clock data, pixel color data, a horizontal synchronization signal, or a vertical synchronization signal. The pixel clock data may be a signal having a high level during a data output period. The pixel color data may correspond to RGB information of a pixel. The horizontal synchronization signal may be a row differentiating signal, and the vertical synchronization signal may be a frame differentiating signal.

The first to nth image controllers 141 to 14$n$ receive the first to nth image data D1 to Dn from the first to nth decoders 131 to 13$n$. The number of the image controllers may be equal to the number of the cameras included in the camera unit 110, and may be equal to the number of the decoders. In this case, the image controllers receive image data from corresponding decoders. The first image controller 141 may receive the first image data D1 from the first decoder 131, and the second image controller 142 may receive the second image data D2 from the second decoder 132.

The first to nth image controllers 141 to 14$n$ generate first to nth pixel data P1 to Pn on the basis of the first to nth image data D1 to Dn. The first to nth image controllers 141 to 14$n$ may analyze the vertical synchronization signals and the horizontal synchronization signals included in the first to nth image data D1 to Dn to generate the first to nth pixel data P1 to Pn. The first to nth pixel data P1 to Pn may represent data applied to a display device (not shown) to display an image corresponding to a single frame.

The first to nth image controllers 141 to 14$n$ provide the first to nth pixel data P1 to Pn to the first to nth memories 151 to 15$n$. When the first to nth memories 151 to 15$n$ store the first to nth pixel data P1 to Pn, the first to nth image controllers 141 to 14$n$ provide first to nth interrupt signals IR1 to IRn to the processor 160. Upon receiving the first to nth interrupt signals IR1 to IRn, the processor 160 reads the first to nth pixel data P1 to Pn stored in the first to nth memories 151 to 15$n$.

The first to nth pixel data P1 to Pn are generated on the basis of the first to nth image signals I1 to In generated simultaneously. In the case where the first to nth interrupt signals IR1 to IRn are simultaneously applied to the processor 160, it is easy for the processor 160 to recognize that the first to nth pixel data P1 to Pn are data corresponding to a single identical frame. In the case where the first to nth pixel data P1 to Pn are provided to the processor 160 at different times, it may be difficult to achieve image synchronization.

The first to nth memories 151 to 15$n$ store the first to nth pixel data P1 to Pn received from the first to nth image controllers 141 to 14$n$. The number of the memories may be equal to the number of the cameras included in the camera unit 110, the number of the decoders, and the number of the image controllers. In this case, the memories receive pixel data from corresponding image controllers. The first memory 151 receives the first pixel data P1 from the first image controller 141. The second memory 152 receives the second pixel data P2 from the second image controller 142.

The first to nth memories 151 to 15n may store pixel data corresponding to a single frame. For example, the first to nth memories 151 to 15n may include at least one of a dynamic random access memory (DRAM), a static RAM (SRAM), a phase-change RAM (PRAM), a magnetic RAM (MRAM), a ferroelectric RAM (FeRAM), or a resistive RAM (RRAM). When the processor 160 receives the first to nth interrupt signals IR1 to IRn, the first to nth memories 151 to 15n may provide first to nth pixel data P1' to Pn' to the processor 160.

The processor 160 receives the first to nth pixel data P1' to Pn' from the first to nth memories 151 to 15n on the basis of the first to nth interrupt signals IR1 to IRn. For example, upon receiving the first interrupt signal IR1, the processor 160 reads the first pixel data P1' stored in the first memory 151. Upon receiving the second interrupt signal IR2, the processor 160 reads the second pixel data P2' stored in the second memory 152.

Since the processor 160 of FIG. 1 receives a plurality of interrupt signals from the first to nth image controllers 141 to 14n respectively, it is difficult for the processor 160 to receive the first to nth pixel data P1' to Pn' at the same time. Furthermore, image signals respectively corresponding to the first to nth cameras 111 to 11n are processed via different elements. Therefore, a difference occurs due to an error or a delay caused by different data transfer paths.

Figure 2:
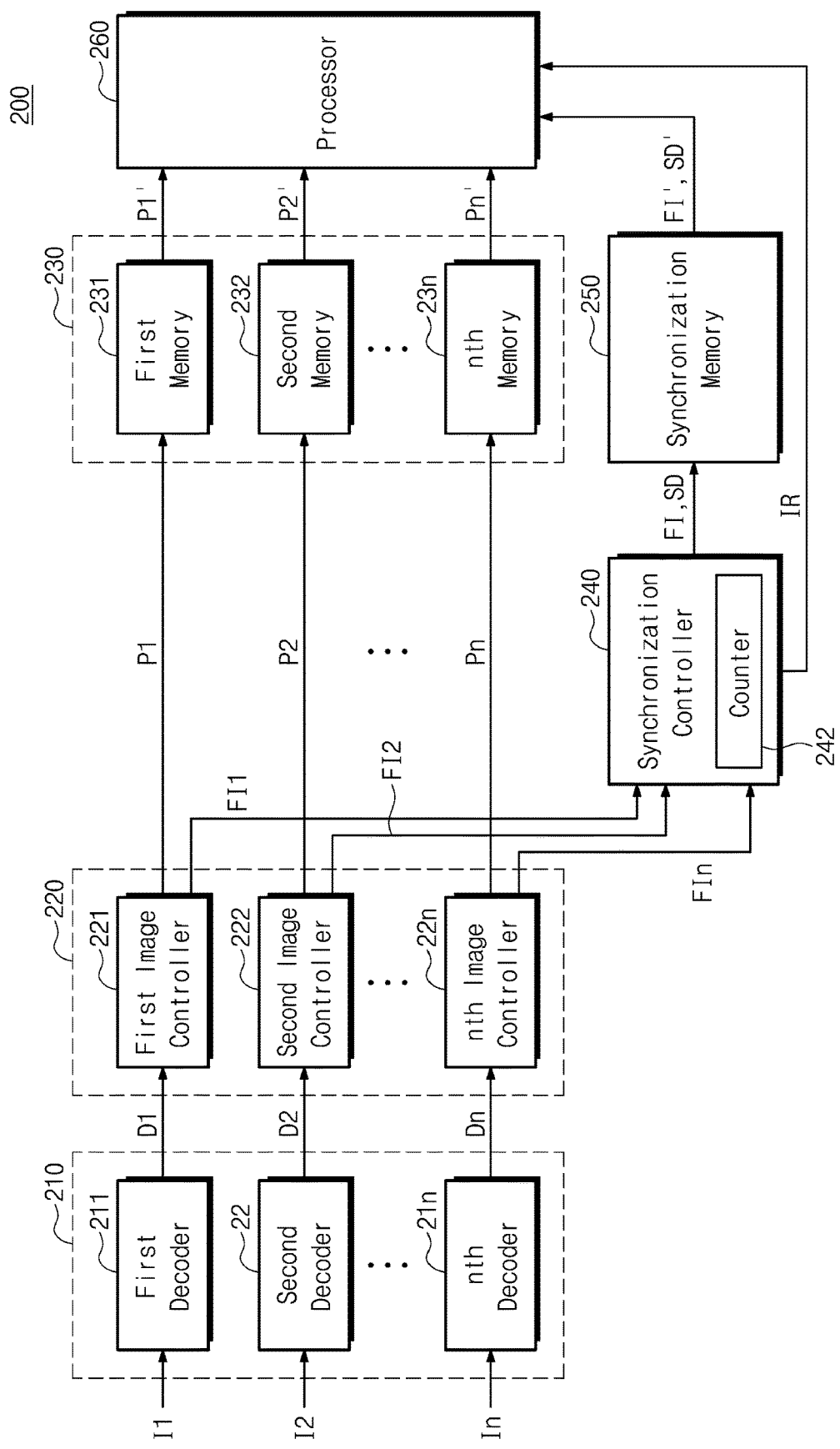
FIG. 2 is a block diagram illustrating a frame grabber according to an embodiment of the inventive concept.

FIG. 2 is a block diagram illustrating a frame grabber according to an embodiment of the inventive concept. Referring to FIG. 2, a frame grabber 200 includes a decoder 210, an image controller 220, a memory 230, a synchronization controller 240, a synchronization memory 250, and a processor 260. The decoder 210 includes first to nth decoders 211 to 21n. The image controller 220 includes first to nth image controllers 221 to 22n. The memory 230 includes first to nth memories 231 to 23n.

The decoder 210 receives first to nth image signals I1 to In. The first to nth decoders 211 to 21n generate first to nth image data D1 to Dn, which are digital signals, by decoding the first to nth image signals I1 to In. The first to nth decoders 211 to 21n are identical to the first to nth decoders 131 to 13n of FIG. 1.

The image controller 220 receives the first to nth data D1 to Dn. The first to nth image data D1 to Dn received by the first to nth image controllers 221 to 22n may include at least one of pixel clock data, pixel color data, a horizontal synchronization signal, or a vertical synchronization signal as described above with reference to FIG. 1. The first to nth image controllers 221 to 22n may analyze the horizontal synchronization signals and the vertical synchronization signals to generate first to nth pixel data P1 to Pn.

The image controller 220 generates first to nth frame information data FI1 to FIn. For example, the first image controller 221 generates the first frame information data FI1, and the second image controller 222 generates the second frame information data FI2. The first to nth frame information data FI1 to FIn may be generated on the basis of the first to nth image data D1 to Dn. The first to nth frame information data FI1 to FIn include identification information corresponding to the first to nth pixel data P1 to Pn. For example, the first to nth frame information data FI1 to FIn may include identification information of a camera, address information of a memory, size information of pixel data, or display area information of pixel data.

The identification information of a camera may be information corresponding to a camera which has provided an image signal for generating corresponding pixel data. For example, each of first to nth cameras respectively corresponding to the first to nth image controllers 221 to 22n may have an allocated unique ID, and the identification information of a camera may be allocated unique ID information. The address information of a memory may correspond to location information of a memory in which corresponding pixel data is stored. The size information of pixel data may be information corresponding to a data amount of the pixel data. The display area information of pixel data may be information on an area in which an image based on the pixel data is displayed in the case where a display device (not shown) displays an image on the basis of the pixel data.

The memory 230 receives the first to nth pixel data P1 to Pn. The first to nth memories 231 to 23n store the first to nth pixel data P1 to Pn. When the processor 260 receives an interrupt signal IR, the first to nth memories 231 to 23n may provide the first to nth pixel data P1' to Pn' to the processor 260. The first to nth memories 231 to 23n are identical to the first to nth memories 151 to 15n of FIG. 1.

The synchronization controller 240 receives the first to nth frame information data FI1 to FIn from the image controller 220. The synchronization controller 240 generates synchronization data SD on the basis of the first to nth frame information data FI1 to FIn. The synchronization controller 240 provides, to the synchronization memory 250, the synchronization data SD and frame information data FI including the first to nth frame information data FI1 to FIn.

The first to nth frame information data FI1 to FIn may be input to the synchronization controller 240 at different time points. In an ideal case, the first to nth frame information data FI1 to FIn are generated on the basis of the first to nth image signals I1 to In generated simultaneously. Thus, the first to nth frame information data FI1 to FIn may be input to the synchronization controller 240 simultaneously. However, paths through which the first to nth frame information data FI1 to FIn are generated and paths through which the first to nth frame information data FI1 to FIn are provided to the synchronization controller 240 are different from each other. Therefore, the first to nth frame information data FI1 to FIn may be provided to the synchronization controller 240 at different times.

The first to nth frame information data FI1 to FIn are provided to the synchronization controller 240 on a frame-by-frame basis. For example, the image controller 220 provides pixel data of a first frame to the memory 230, and provides frame information data of the first frame to the synchronization controller 240. Thereafter, the image controller 220 provides pixel data of a second frame, which is a next frame of the first frame, to the memory 230, and provides frame information data of the second frame to the synchronization controller 240. A difference between a time point at which image signals for the first frame are generated and a time point at which image signals for the second frame are generated depends on a set frame rate. An input time point difference between the first to nth frame information data FI1 to FIn is smaller than a time point difference between the first fame and the second frame. This is because the cameras which generate the first to nth image signals I1 to In are physically synchronized, and a time delay due to signal transfer path may be shorter than the time point difference between frames.

The synchronization controller 240 may generate the synchronization data SD after elapse of a reference time since reception of the first to nth frame information data FI1 to FIn. In this case, the reference time may be defined as a difference between a time point at which the synchronization controller 240 receives last frame information data and a time point at which the synchronization controller 240 generates the synchronization data SD. However, the reference time is not limited thereto, and thus may be variously defined. For example, the reference time may be defined as a difference between a time point at which the synchronization controller 240 provides the last frame information data to the synchronization memory 250 and a time point at which the synchronization controller 240 generates the synchronization data SD. Alternatively, the reference time may be defined as a difference between a time point at which the synchronization controller 240 provides the last frame information data to the synchronization memory 250 and a time point at which the synchronization controller 240 provides the synchronization data SD to the synchronization memory 250.

The reference time may be a preset value. The reference time may be a value determined in consideration of a frame rate and an estimated input time point difference between the first to nth frame information data FI1 to FIn. For example, when time points at which the first to nth frame information data FI1 to FIn are provided to the synchronization controller 240 are sequentially arranged, the reference time may be longer than a maximum value among differences between adjacent time points. Furthermore, the reference time may be shorter than a difference between a time point at which frame information data among the frame information data of the first frame is lastly provided to the synchronization controller 240 and a time point at which frame information data among the frame information data of the second frame is initially provided to the synchronization controller 240.

The synchronization controller 240 may include a counter 242. The counter 242 generates a counter value. The counter 242 resets the counter value when the synchronization controller 240 receives frame information data. The counter 242 increases the counter value while the synchronization controller 240 does not receive frame information data. When the counter value is equal to or larger than a reference value, the synchronization controller 240 may generate the synchronization data SD. The reference value may correspond to the reference time. That is, the counter 242 increases the counter value during the reference time. The counter value increased during the reference time may be equal to the reference value.

The synchronization data SD is a signal for synchronizing the first to nth pixel data P1 to Pn. The synchronization data SD may be generated after the reference time, and then may be provided to the synchronization memory 250. In this case, the processor 260 may recognize that data received after the synchronization data SD is related to a next frame. That is, a previous frame and a next frame may be differentiated from each other on the basis of the synchronization data SD. Relevant detailed descriptions will be provided with reference to FIG. 4.

Alternatively, the synchronization data SD may be provided to the synchronization memory 250 together with the first to nth frame information data FI1 to FIn. In this case, synchronization data SD may include counter information corresponding to the counter value set when receiving frame information data. The counter value may be generated on the basis of a time between a time point at which the frame information data is provided and a time point at which previous frame information data is provided. The processor 260 may determine whether frame information data is related to a corresponding frame by using the counter information provided together with the frame information data. For example, when the counter value extracted from the counter information is equal to or larger than the reference value, frame information data received previously may be related to a previous frame. Even in this case, a previous frame and a next frame may be differentiated from each other on the basis of the synchronization data SD. Relevant detailed descriptions will be provided with reference to FIG. 5.

The synchronization controller 240 generates the interrupt signal IR. Unlike the interrupt signals of FIG. 1, the interrupt signal IR is generated in the single synchronization controller 240. Therefore, the problem in which the first to nth pixel data P1 to Pn are not synchronized due to a reception time point difference between the interrupt signals does not occur. The interrupt signal IR is provided to the processor 260. When the synchronization memory 250 stores the frame information data FI and the synchronization data SD, and the first to nth memories 231 to 23n store the first to nth pixel data P1 to Pn, the synchronization controller 240 provides the interrupt signal IR to the processor 260.

The synchronization memory 250 receives the frame information data FI and the synchronization data SD from the synchronization controller 240. The synchronization memory 250 stores the frame information data FI and the synchronization data SD. The frame information data FI includes the first to nth frame information data FI1 to FIn. The synchronization memory 250 stores the first to nth frame information data FI1 to FIn in order in which the first to nth frame information data FI1 to FIn are provided to the synchronization controller 240.

In the case where the synchronization controller 240 generates the synchronization data SD after receiving the first to nth frame information data FI1 to FIn, the synchronization memory 250 stores the synchronization data SD after storing the first to nth frame information data FI1 to FIn. In the case where the synchronization controller 240 generates pieces of the counter information together with the first to nth frame information data FI1 to FIn, the synchronization memory 250 stores the pieces of the counter information in order in which the first to nth frame information data FI1 to FIn are stored.

The synchronization memory 250 may include a first-in first-out (FIFO) circuit. The synchronization memory 250 stores data in order in which the data were received. The synchronization memory 250 outputs data in order in which the data were stored. That is, the synchronization memory 250 outputs, to the processor 260, the first to nth frame information data FI1 to FIn and the synchronization data SD in order in which the first to nth frame information data FI1 to FIn and the synchronization data SD were stored. When the frame information data are simultaneously received, the synchronization memory 250 may sequentially store the frame information data according to a predefined priority order.

The processor 260 performs image processing on the first to nth pixel data P1' to Pn'. The processor 260 receives the interrupt signal IR. The processor 260 reads frame information data FI' and synchronization data SD' stored in the synchronization memory 250, on the basis of the interrupt signal IR. The processor 260 reads the frame information data FI' and the synchronization data SD' according to a data output order of the synchronization memory 250.

The processor 260 receives pixel data from a corresponding memory on the basis of the identification information of a camera, the address information of a memory, the size information of pixel data, and the display area information of pixel data included in the frame information data FI', and performs the image processing on the pixel data received. For example, the processor 260 receives the first pixel data P1' from the first memory 231 on the basis of the ID information of the first camera, the address information of the first memory 231, and the size information of the first pixel data P1 included in the first frame information data FI1. The processor 260 may determine an arrangement order when providing the first pixel data P1' to a display device (not shown) on the basis of the display area information of pixel data.

The processor 260 synchronizes the first to nth pixel data P1' to Pn' on the basis of the synchronization data SD'. The processor 260 receives the first to nth pixel data P1' to Pn' on the basis of the frame information data FI', and determines whether the received pixel data correspond to a single frame. The processor 260 may determine a frame corresponding to the received pixel data on the basis of the synchronization data SD'.

The frame grabber 200 processes the first to nth pixel data P1 to Pn differently from the first to nth frame information data FI1 to FIn, and stores the first to nth pixel data P1 to Pn and the first to nth frame information data FI1 to FIn in different memories. The frame grabber 200 integrally manages the first to nth frame information data for the first to nth pixel data P1 to Pn by using the synchronization controller 240 and the synchronization memory 250. Therefore, the frame grabber 200 may easily and accurately synchronize image signals which are different from each other due to the plurality of cameras.

The frame grabber 200 does not additionally provide a synchronization signal to the plurality of cameras. The frame grabber 200 performs image synchronization using frame information data based on image signals received internally. Therefore, a signal delay or error caused by a path for providing a synchronization signal to a camera unit does not occur. Furthermore, a communication line or the like for transferring a signal to the plurality of cameras is not required.

Figure 3:
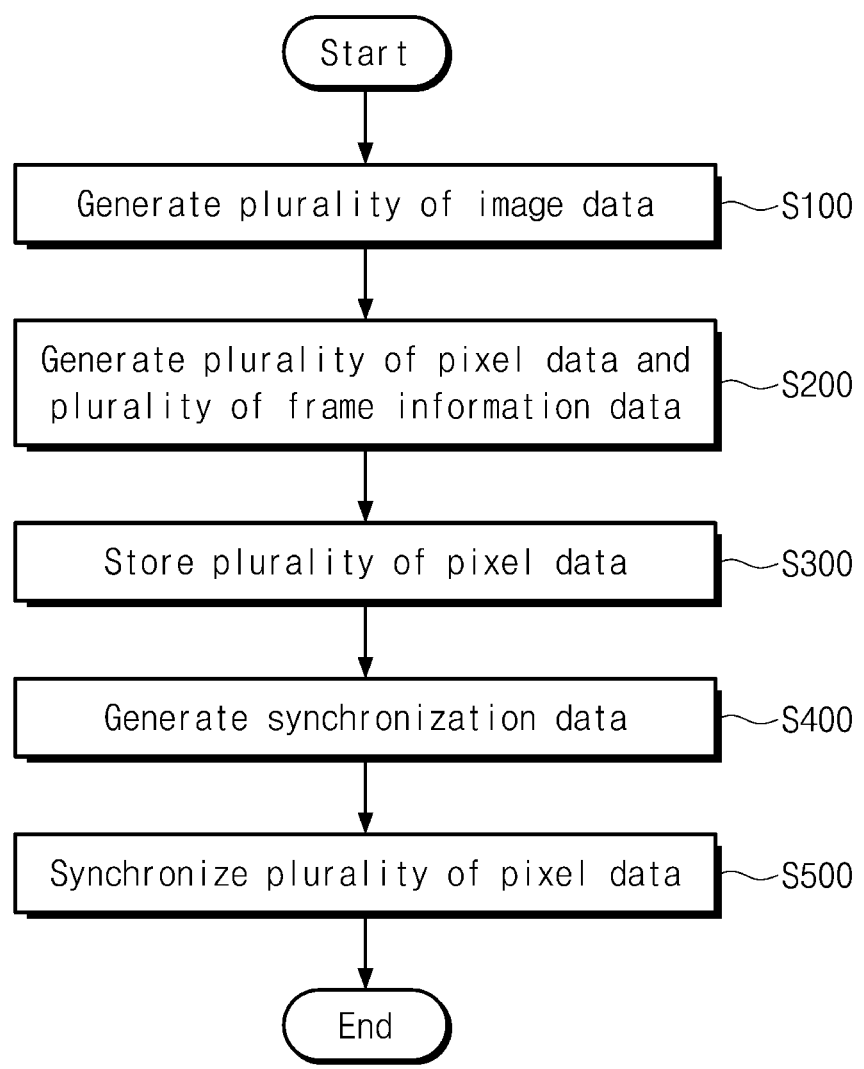
FIG. 3 is a flowchart illustrating an image processing method using a frame grabber according to an embodiment of the inventive concept.

FIG. 3 is a flowchart illustrating an image processing method using a frame grabber according to an embodiment of the inventive concept. Referring to FIG. 3, the image processing method may be performed in the frame grabber 200 of FIG. 2 or the frame grabber 300 of FIG. 6 which is described below. For convenience, the image processing method of FIG. 3 is described as being performed in the frame grabber 200 of FIG. 2. The frame grabber 200 receives a plurality of image signals from a plurality of cameras. Time points at which the plurality of cameras detect images may be the same. However, due to a difference between transfer paths through which the frame grabber 200 receives image signals from the plurality of cameras, the frame grabber 200 may receive the image signals at different time points.

In operation S100, the frame grabber 200 generates a plurality of image data. The frame grabber 200 generates the plurality of image data on the basis of the plurality of image signals received from the plurality of cameras. Operation S100 may be performed in the decoder 210. The decoder 210 generates the plurality of image data by decoding the plurality of image signals. The decoder 210 may include a plurality of decoders, and the decoders may respectively decode image signals received from different cameras.

In operation S200, the frame grabber 200 generates a plurality of pixel data and a plurality of frame information data FI. The frame grabber 200 generates the plurality of pixel data and the plurality of frame information data FI on the basis of the plurality of image data. Operation S200 may be performed in the image controller 220. The image controller 220 may include a plurality of image controllers. The image controllers receive image data generated on the basis of different cameras. Each image controller generates pixel data and frame information data for a corresponding camera on the basis of the image data.

In operation S300, the frame grabber 200 stores the plurality of pixel data. Operation S300 may be performed in the memory 230. The memory 230 may include a plurality of memories. The memories store pixel data generated on the basis of different cameras. Time points at which the pixel data are stored in the memories may be different from each other.

In operation S400, the frame grabber 200 generates the synchronization data SD. The frame grabber 200 generates the synchronization data SD on the basis of the plurality of frame information data. Operation S400 may be performed in the synchronization controller 240. The synchronization controller 240 receives the plurality of frame information data. When the synchronization controller 240 receives all the frame information data corresponding to a single frame, the synchronization controller 240 provides the synchronization data SD to the synchronization memory 250. The synchronization memory 250 stores the plurality of frame information data FI and the synchronization data SD. The synchronization memory 250 provides the plurality of frame information data FI' and the synchronization data SD' to the processor 260 in order in which the plurality of frame information data FI and the synchronization data SD were received by the synchronization memory 250.

In operation S500, the frame grabber 200 synchronizes the plurality of pixel data. Operation S500 may be performed in the processor 260. The processor 260 receives the plurality of pixel data from the memory 230 on the basis of the plurality of frame information data FI'. The processor 260 synchronizes the plurality of pixel data on the basis of the synchronization data SD'.

Figure 4:
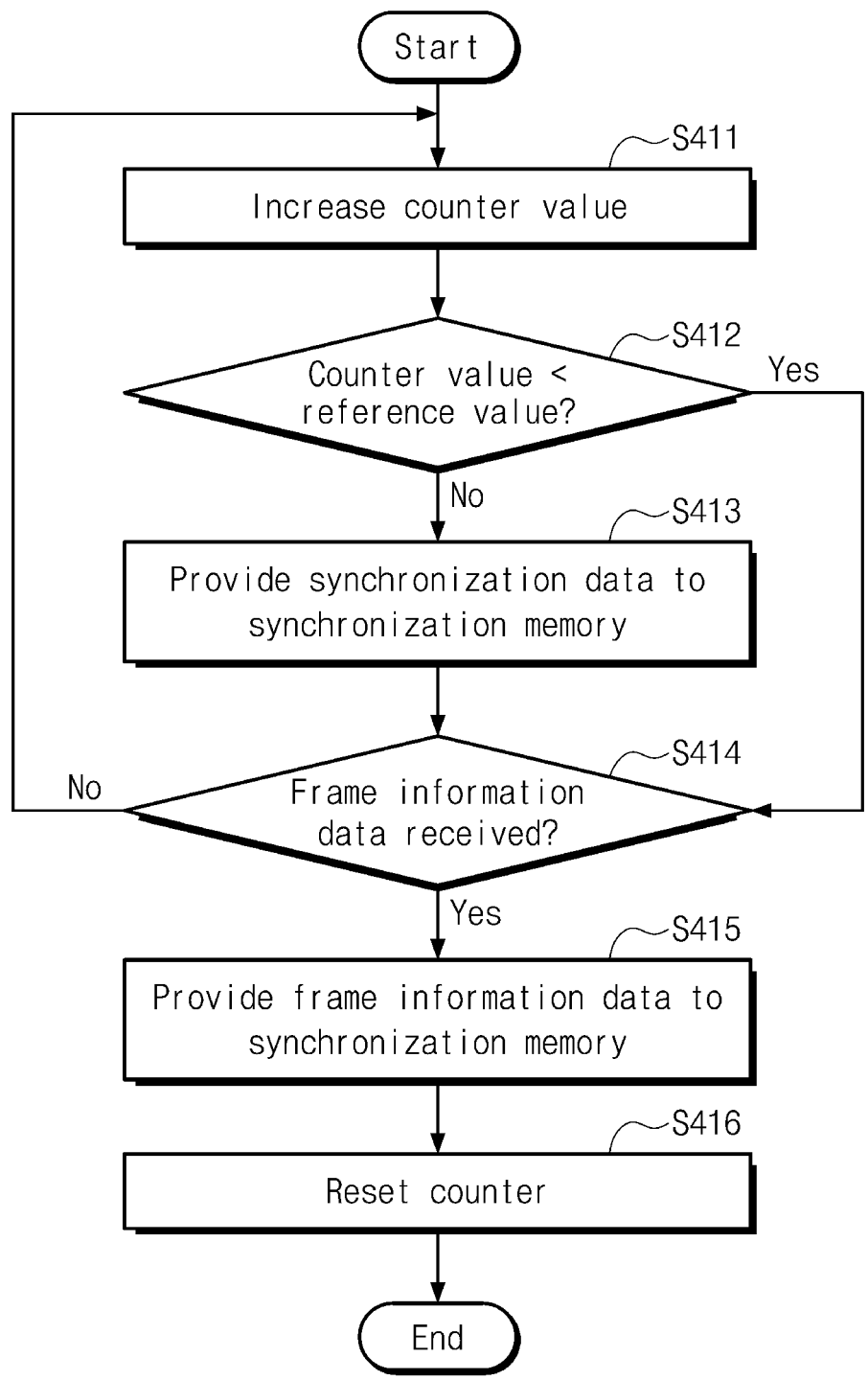
FIGS. 4 and 5 are flowcharts illustrating methods for driving a synchronization controller according to an embodiment of the inventive concept.

FIG. 4 is a flowchart illustrating a method for driving a synchronization controller according to an embodiment of the inventive concept. FIG. 4 is a flowchart illustrating an example of operation S400 of FIG. 3 for generating the synchronization data. Referring to FIG. 4, the method for driving a synchronization controller is performed in the synchronization controller 240 of FIG. 2. Furthermore, the method for driving a synchronization controller may be performed using the counter 242 of FIG. 2. It is assumed that the counter 242 is reset at an initial stage of FIG. 4.

In operation S411, the synchronization controller 240 increases the counter value. When the frame information data FI is not received from the image controller 220, the synchronization controller 240 increases the counter value. Operation S411 may be performed in the counter 242. For example, when the counter value is 0, the counter 242 may increase the counter value to 1. An increasing rate of the counter value may be preset.

In operation S412, the synchronization controller 240 compares the counter value with a reference value. The reference value may be a preset value. The reference value is set to differentiate the frame information data corresponding to a previous frame and the frame information data corresponding to a next frame. For example, the reference value has a smaller value than that of a change of the counter value during a time between a time point at which the synchronization controller 240 receives last frame information data of the previous frame and a time point at which the synchronization controller 240 receives first frame information data of the next frame.

When the counter value is smaller than the reference value in operation S412, the process proceeds to operation S414. The counter value which is smaller than the reference value may represent that it is early to determine that currently lastly received frame information data is the last frame information data of a corresponding frame. Therefore, when the counter value is smaller than the reference value, the synchronization controller 240 does not generate the synchronization data SD. When the counter value is equal to or larger than the reference value, the process proceeds to operation S413. When the counter value is equal to or larger than the reference value, currently lastly received frame information data is determined as the last frame information data of the corresponding frame. That is, a time taken for the counter value to reach the reference value is determined as a time interval for switching from a previous frame to a next frame.

In operation S413, the synchronization controller 240 generates the synchronization data SD, and provides the synchronization data SD to the synchronization memory 250. When the counter value is equal to or larger than the reference value in operation S412, it is determined that all the frame information data of the corresponding frame have been received. After all the frame information data of the corresponding frame are provided to the synchronization memory 250, the synchronization controller 240 provides the synchronization data SD to the synchronization memory 250.

In operation S414, the synchronization controller 240 receives the frame information data FI. When the frame information data FI is received after operation S413, the synchronization controller 240 may regard the frame information data being received as frame information data of a next frame. When the frame information data FI is received after operation S412, the synchronization controller 240 may regard the frame information data being received as frame information data of the corresponding frame.

When the synchronization controller 240 is unable to receive the frame information data FI in operation S414, the process returns to operation S411. That is, the synchronization controller 240 increases the counter value. The synchronization controller 240 increases the counter value while performing operations S411 to S414 until the frame information data FI is received. When the synchronization controller 240 receives the frame information data FI, the process proceeds to operation S415.

In operation S415, the synchronization controller 240 provides the frame information data FI to the synchronization memory 250. In operation S416, the synchronization controller 240 resets the counter value. Operation S416 may be performed in the counter 242. After resetting the counter value, the counter 242 may increase the counter value until next frame information data is received. That is, after operation S416 is performed, the process may return to operation S411. When operations S411 to S416 are repeated, the synchronization controller 240 may provide the frame information data FI to the synchronization memory 250 in order in which the frame information data FI were received by the synchronization controller 240. Furthermore, the synchronization data SD may be provided to the synchronization memory 250 between frame information data corresponding to a previous frame and frame information data corresponding to a next frame.

Figure 5:
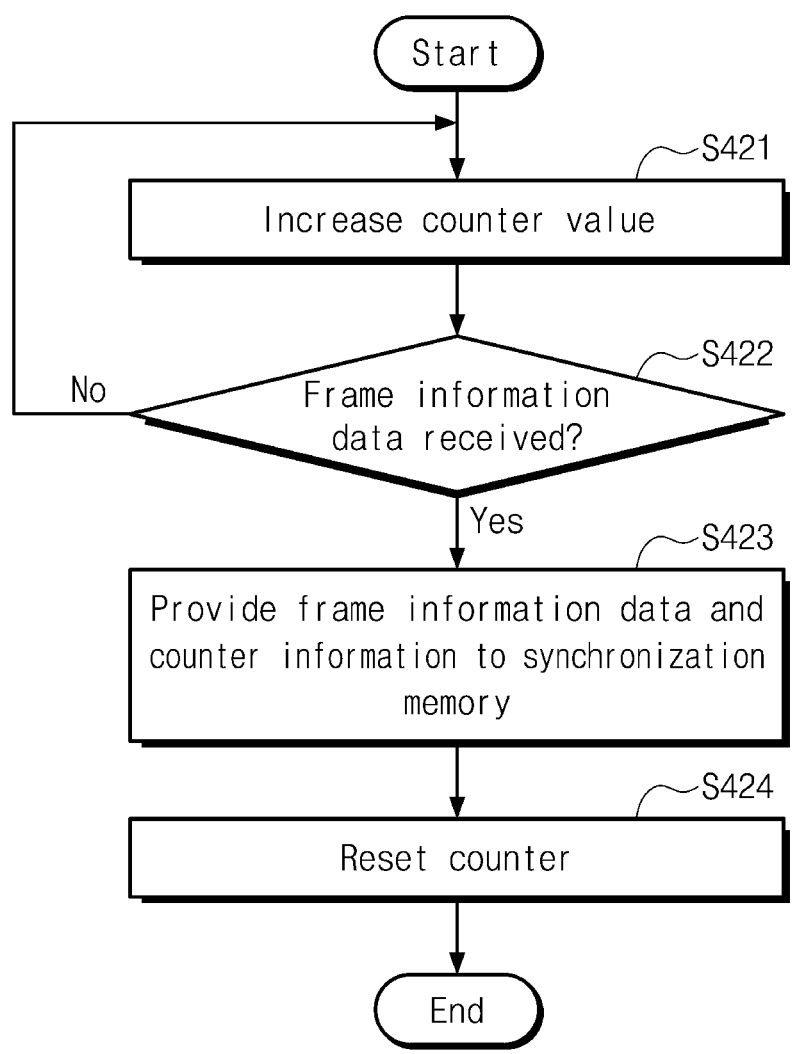

FIG. 5 is a flowchart illustrating a method for driving a synchronization controller according to another embodiment of the inventive concept. In detail, FIG. 5 is a flowchart illustrating another example of operation S400 of FIG. 3 for generating the synchronization data. Referring to FIG. 5, the method for driving a synchronization controller is performed in the synchronization controller 240 of FIG. 2. Furthermore, the method for driving a synchronization controller may be performed using the counter 242 of FIG. 2. In operation S421, the synchronization controller 240 increases the counter value. When the frame information data is not received from the image controller 220, the synchronization controller 240 increases the counter value. Operation S421 may be performed in the counter 242.

In operation S422, the synchronization controller 240 receives the frame information data FI. When the synchronization controller 240 does not receive the frame information data FI, the process returns to operation S421. That is, the synchronization controller 240 increases the counter value while repeating operations S421 and S422 until the frame information data FI is received. When the synchronization controller 240 receives the frame information data FI, operation S423 is performed.

In operation S423, the synchronization controller 240 provides the frame information data FI to the synchronization memory 250. Furthermore, the synchronization controller 240 provides the counter information to the synchronization memory 250. The counter information corresponds to the counter value. In operation S423, the synchronization controller 240 provides, to the synchronization memory 250, a single piece of frame information data and the counter information corresponding thereto.

The processor 260 may analyze the counter information corresponding to frame information data to perform image synchronization. For example, when the counter value included in the counter information corresponding to frame information data is equal to or larger than a reference value, this fact may represent that next frame information data has not been received until a reference time elapses. Therefore, frame information data received after frame information data having the counter value equal to or larger than the reference value corresponds to a next frame. Therefore, a previous frame and a next frame may be easily differentiated from each other.

In operation S424, the synchronization controller 240 or the counter 242 resets the counter value. After resetting the counter value, the synchronization controller 240 or the counter 242 may increase the counter value until next frame information data is received. That is, after operation S424 is performed, operation S421 may be performed. When operations S421 to S424 are repeated, the synchronization controller 240 may provide the frame information data FI to the synchronization memory 250 in order in which the frame information data FI were received by the synchronization controller 240.

Figure 6:
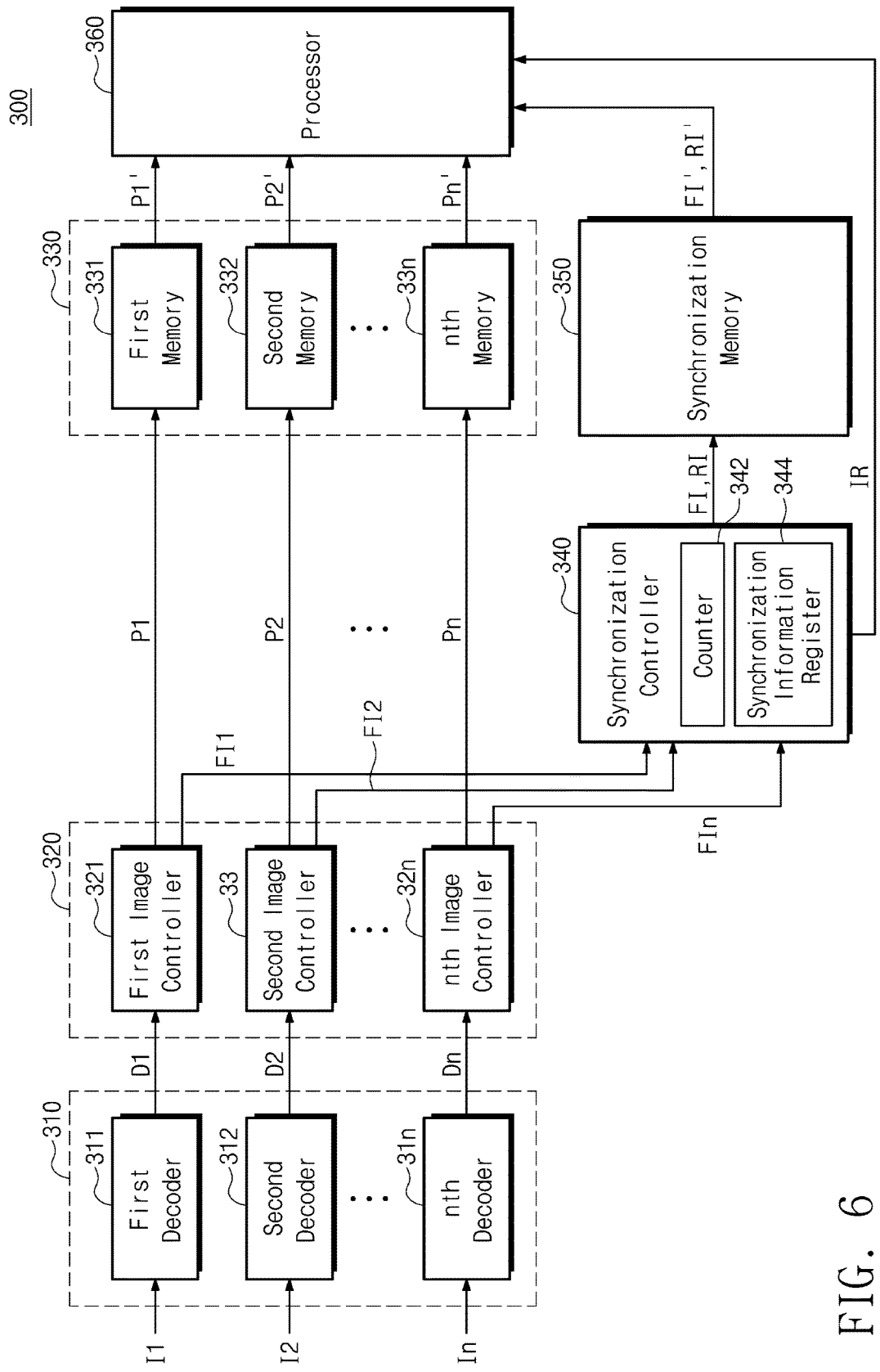
FIG. 6 is a block diagram illustrating a frame grabber according to an embodiment of the inventive concept.

FIG. 6 is a block diagram illustrating a frame grabber according to another embodiment of the inventive concept. Referring to FIG. 6, a frame grabber 300 includes a decoder 310, an image controller 320, a memory 330, a synchronization controller 340, a synchronization memory 350, and a processor 360. The frame grabber 300 may receive first to nth image signals I1 to In.

The decoder 310 includes first to nth decoders 311 to 31$n$. The image controller 320 includes first to nth image controllers 321 to 32$n$. The memory 330 includes first to nth memories 331 to 33$n$. The decoder 310, the image controller 320, and the memory 330 have the same structures and perform the same functions as the decoder 210, the image controller 220, and the memory 230 of FIG. 2.

The synchronization controller 340 receives first to nth frame information data FI1 to FIn from the image controller 320. The synchronization controller 340 generates register information RI on the basis of the first to nth frame information data FI1 to FIn. The register information RI may be regarded as a type of the synchronization data SD of FIG. 4. The synchronization controller 340 provides, to the synchronization memory 350, the register information RI and frame information data FI including the first to nth frame information data FI1 to FIn. In this case, the synchronization controller 340 provides an interrupt signal IR to the processor 360.

The synchronization controller 340 includes a counter 342 and a synchronization information register 344. The counter 342 generates a counter value. The counter 342 resets the counter value when the synchronization controller 340 receives the frame information data FI. The counter 342 increases the counter value while the synchronization controller 340 does not receive the frame information data FI. When the counter value is equal to or larger than a reference value, the synchronization controller 340 increases a synchronization information register value.

The synchronization information register 344 generates the synchronization information register value. When the counter value is equal to or larger than the reference value, the synchronization information register 344 increases the synchronization information register value. That is, during switching from a previous frame to a next frame, the synchronization information register 344 may increase the synchronization information register value. When all the frame information data FI corresponding to a single frame are stored in the synchronization memory 350, the synchronization information register 344 may increase the synchronization information register value. The synchronization information register 344 may increase the synchronization information register value by 1. For example, when the synchronization information register value is 1 at a previous frame, the synchronization information register value becomes 2 at a next frame. When operation of the frame grabber 300 is ended or is initiated, the synchronization information register 344 may reset the synchronization information register value.

When providing the frame information data FI to the synchronization memory 350, the synchronization controller 340 provides the register information RI to the synchronization memory 350. The register information RI corresponds to the synchronization information register value set when the synchronization controller 340 receives the frame information data FI. For example, when the synchronization controller 340 receives the first frame information data FI1 from the first image controller 321, first register information is generated on the basis of the synchronization information register value stored in the synchronization information register 344. The synchronization controller 340 provides the first frame information data FI1 and the first register information to the synchronization memory 350. When the synchronization controller 340 receives the second frame information data FI2 from the second image controller 322, second register information is generated. When the first frame information data FI1 and the second frame information data FI2 correspond to pixel data of the same frame, the first register information is identical to the second register information.

The synchronization memory 350 receives the frame information data FI and the register information RI from the synchronization controller 340. The synchronization memory 350 stores the frame information data FI and the register information RI. The synchronization memory 350 may include a FIFO circuit. The synchronization memory 350 stores data in order in which the data were received. The synchronization memory 350 outputs data in order in which the data were stored.

The processor 360 performs image processing on first to nth pixel data P1' to Pn'. The processor 360 reads frame information data FI' and register information RI' stored in the synchronization memory 350, on the basis of the interrupt signal IR. The processor 360 reads the frame information data FI' and the register information RI' according to a data output order of the synchronization memory 350. The processor 360 receives pixel data from a corresponding memory on the basis of the frame information data FI', and performs image processing on the pixel data.

The processor 360 synchronizes first to nth pixel data P1 to Pn on the basis of the register information RI'. Pieces of register information generated on the basis of the same frame have the same synchronization information register value. Pieces of register information generated on the basis of image signals of different frames have different synchronization information register values. Therefore, the processor 360 may determine frames corresponding to received pixel data by using the register information RI'.

Figure 7:
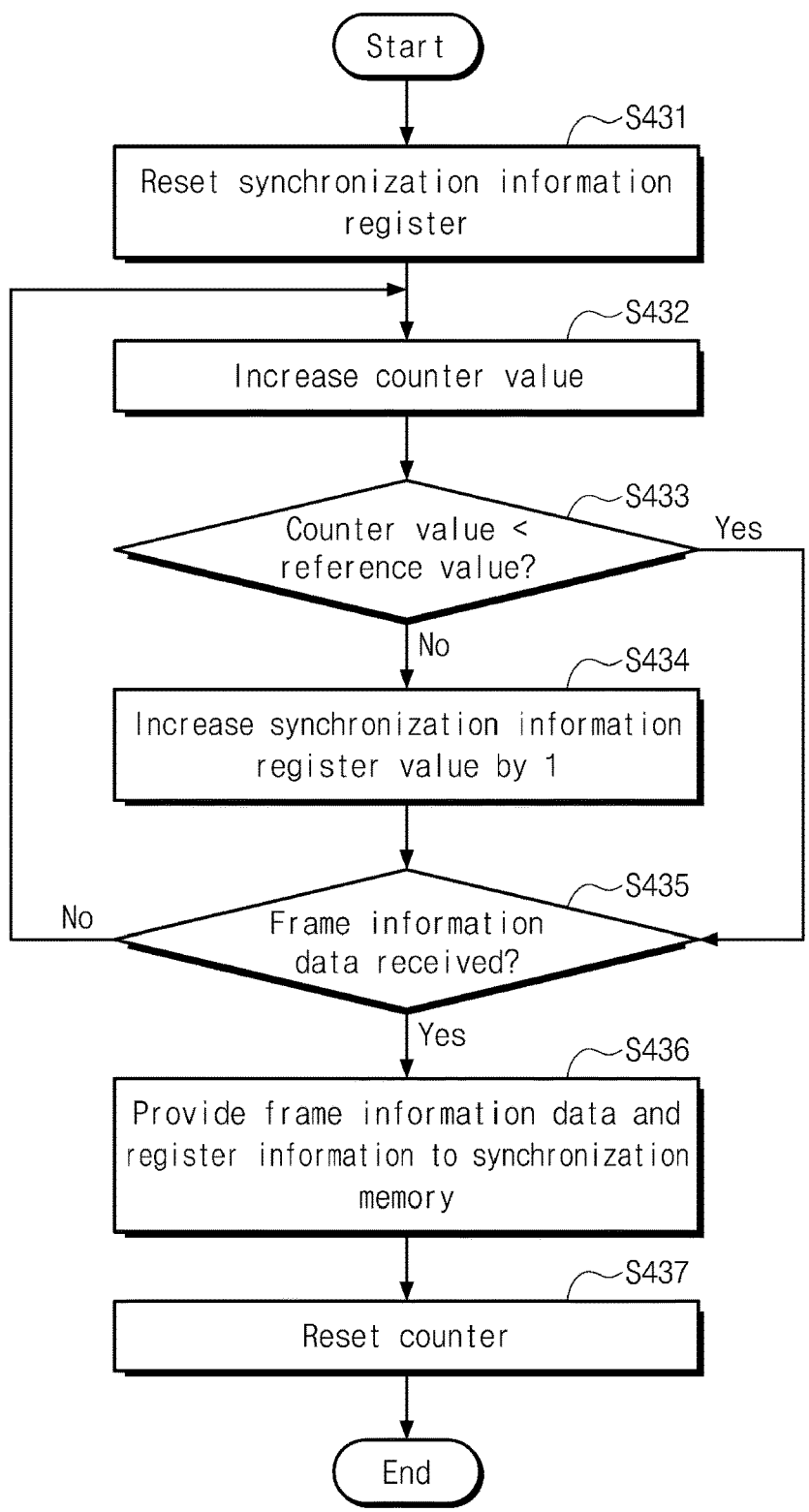
FIG. 7 is a flowchart illustrating a method for driving a synchronization controller according to an embodiment of the inventive concept.

FIG. 7 is a flowchart illustrating a method for driving a synchronization controller according to another embodiment of the inventive concept. Referring to FIG. 7, the method for driving a synchronization controller is performed in the synchronization controller 340 of FIG. 6. Furthermore, the method for driving a synchronization controller may be performed using the counter 342 and the synchronization information register 344 of FIG. 6.

In operation S431, the synchronization controller 340 resets the synchronization information register value. Operation S431 may be performed in the synchronization information register 344. In operation S431, operation of the frame grabber 300 is initiated. That is, the frame grabber 300 may start to receive image signals from a camera unit. In operation S432, the synchronization controller 340 increases the counter value. Operation S432 may be performed in the counter 342. When the frame information data FI is not received from the image controller 320, the synchronization controller 340 increases the counter value.

In operation S433, the synchronization controller 340 compares the counter value with a reference value. The reference value may be preset to differentiate a previous frame and a next frame. When the counter value is smaller than the reference value, the process proceeds to operation S435. The synchronization controller 340 determines, as data corresponding to a current frame, frame information data received at a time point at which the counter value is smaller than the reference value. Therefore, the synchronization information register value is not increased. When the counter value is equal to or larger than the reference value, the process proceeds to operation S434. In operation S434, the synchronization controller 340 determines frame information data received thereafter as data corresponding to a next frame. Therefore, the synchronization controller 340 increases the synchronization information register value by 1. Operation S434 may be performed in the synchronization information register 344.

In operation S435, the synchronization controller 340 receives the frame information data FI. When the frame information data FI is received after operation S434, the synchronization controller 340 may regard the frame information data being received as frame information data of a next frame. When the frame information data FI is received after operation S433, the synchronization controller 340 may regard the frame information data being received as frame information data of a corresponding frame.

When the synchronization controller 340 does not receive the frame information data in operation S435, the process returns to operation S432. That is, the synchronization controller 340 increases the counter value. The synchronization controller 340 increases the counter value while performing operations S432 to S435 until the frame information data FI is received. When the synchronization controller 340 receives the frame information data FI, the process proceeds to operation S436.

In operation S436, the synchronization controller 340 provides the frame information data FI to the synchronization memory 350. Furthermore, the synchronization controller 340 provides the register information RI to the synchronization memory 350. The register information RI corresponds to the synchronization information register value. The synchronization controller 340 provides, to the synchronization memory 350, a single piece of frame information data and the register information RI corresponding thereto.

In operation S437, the synchronization controller 340 or the counter 342 resets the counter value. After resetting the counter value, the synchronization controller 340 or the counter 342 may increase the counter value until next frame information data is received. That is, after operation S437 is performed, operation S432 may be performed. When operations S432 to S437 are repeated, the synchronization controller 340 may provide the frame information data FI to the synchronization memory 350 in order in which the frame information data FI were received by the synchronization controller 340.

Figure 8:
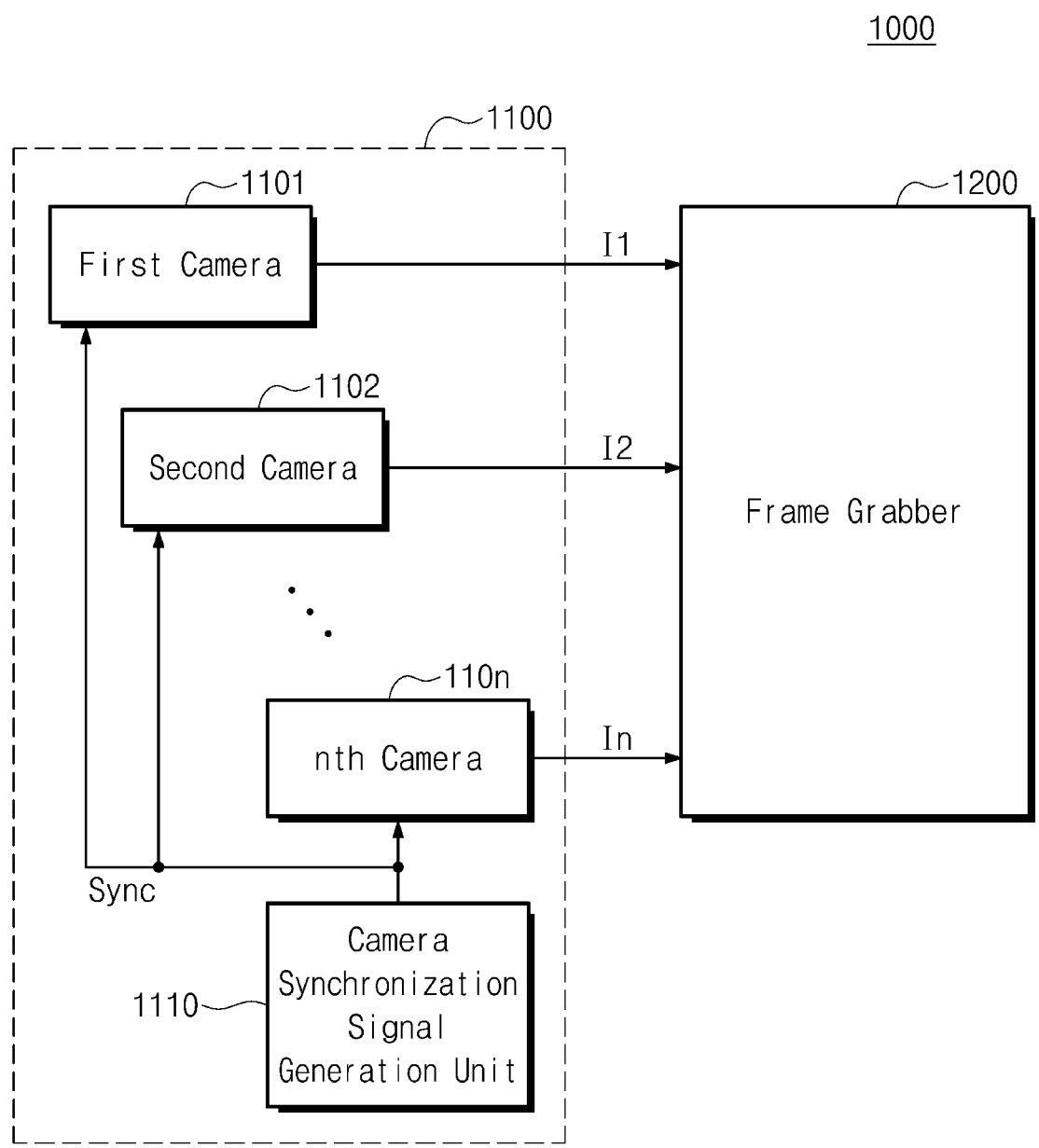
FIG. 8 is a block diagram illustrating an image processing system according to an embodiment of the inventive concept.

FIG. 8 is a block diagram illustrating an image processing system according to an embodiment of the inventive concept. Referring to FIG. 8, an image processing system 1000 includes a camera unit 1100 and a frame grabber 1200. The camera unit 1100 includes first to nth cameras 1101 to 110n and a camera synchronization signal generation unit 1110. The number of cameras included in the camera unit 1100 is not limited. For example, the number of the cameras may be determined in consideration of a usage field or usage pattern of the image processing system 1000, viewing angles of the cameras, a required image detection range, a distance between the cameras, etc.

The first to nth cameras 1101 to 110n are arranged in an electronic device in which the image processing system 1000 is used. The first to nth cameras 1101 to 110n may be arranged at different locations in the electronic device. The first to nth cameras 1101 to 110n may be spaced apart from each other in the electronic device. Therefore, the first to nth cameras 1101 to 110n may capture different images, and may detect images in different directions. For example, in the case where the image processing system 1000 is used in a vehicle, the first camera 1101 may be disposed at a front of the vehicle to capture a front image. The second camera 1102 may be disposed at a side of the vehicle to capture a side image. Furthermore, the nth camera 110n may be disposed at a rear of the vehicle to capture a rear image.

The first to nth cameras 1101 to 110n provide first to nth image signals I1 to In to the frame grabber 1200. For example, the first image signal I1 may correspond to the front image of the vehicle, and the second image signal I2 may correspond to the side image of the vehicle. The first to nth image signals I1 to In may be generated on the basis of images captured at the same time point. That is, the electronic device may recognize the front, the rear, and the side of the vehicle, the images of which were captured at the same time point, on the basis of the first to nth image signals I1 to In. For example, during autonomous driving of the vehicle, the vehicle may recognize objects at the front, the rear, and the side on the basis of the first to nth image signals I1 to In. Here, when the first to nth image signals I1 to In are not recognized as image signals corresponding to a single frame or time point, locations of actual objects are different from locations of recognized objects. Accordingly, it is difficult to perform an autonomous driving function of the vehicle.

Since the first to nth cameras 1101 to 110n are arranged at different locations, transfer paths of the first image signal I1, the second image signal I2, and the nth image signal In may have different lengths. The transfer path of the first image signal I1 is related to a distance between the first camera 1101 and the frame grabber 1200. The transfer path of the second image signal I2 is related to a distance between the second camera 1102 and the frame grabber 1200. The distance between the first camera 1101 and the frame grabber 1200, the distance between the second camera 1102 and the frame grabber 1200, and a distance between the nth camera 110n and the frame grabber 1200 may be different from each other. When the transfer paths are different from each other, a transfer delay may occur due to the difference between the transfer paths. For example, when the distance between the first camera 1101 and the frame grabber 1200 is longer than the distance between the second camera 1102 and the frame grabber 1200, the first image signal I1 may be provided to the frame grabber 1200 at a later time than that at which the second image signal I2 is provided to the frame grabber 1200.

The camera synchronization signal generation unit 1110 generates a camera synchronization signal Sync. The camera synchronization signal generation unit 1110 provides the camera synchronization signal Sync to the first to nth cameras 1101 to 110n. When receiving the camera synchronization signal Sync, the first to nth cameras 1101 to 11n capture images. When receiving the camera synchronization signal Sync, the first to nth cameras 1101 to 110n generate the first to nth image signals I1 to In. Therefore, the first to nth cameras 1101 to 110n may transfer, to the frame grabber 1200, image signals corresponding to a single frame.

The camera synchronization signal generation unit 1110 may be separated as an individual element from the frame grabber 1200. The camera synchronization signal generation unit 1110 provides the camera synchronization signal Sync so that the plurality of cameras may provide image signals corresponding to a single frame. Therefore, the camera synchronization signal generation unit 1110 may be an element unrelated to an image synchronization process according to transfer paths of image signals to the frame grabber 1200 or data transfer paths in the frame grabber 1200.

The frame grabber 1200 may be the frame grabber 200 of FIG. 2. Alternatively, the frame grabber 1200 may be the frame grabber 300 of FIG. 6. The frame grabber 1200 may receive, at different time points, the first to nth image signals I1 to In generated simultaneously. For example, in an electronic device such as a vehicle, a distance difference between the first to nth cameras 1101 to 110n is relatively large. Therefore, the transfer path difference between the first to nth image signals I1 to In is large compared to that in a small electronic device. The frame grabber 1200 separately manages identification information on the first to nth image signals I1 to In received at different time points. Furthermore, the frame grabber 1200 may synchronize first to nth pixel data P1 to Pn even when the first to nth pixel data P1 to Pn generated on the basis of the first to nth image signals I1 to In are stored at different time points.

A frame grabber, an image processing system including the frame grabber, and an image processing method of the frame grabber according to embodiments of the inventive concept may secure easiness and accuracy of image processing by separately managing pixel data and identification information corresponding to the pixel data. Furthermore, according to embodiments of the inventive concept, an image synchronization error caused by signal reception paths of a frame grabber may be minimized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A frame grabber comprising:
   a plurality of decoders configured to generate a plurality of image data by decoding a plurality of image signals respectively received from a plurality of cameras;
   a plurality of image controllers configured to generate a plurality of pixel data and a plurality of frame information data comprising identification information corresponding to the plurality of pixel data on the basis of the plurality of image data, each of the plurality of pixel data corresponding to a respective camera of the plurality of cameras;
   a plurality of pixel-storage memories configured to receive the plurality of pixel data from the plurality of image controllers, and store the plurality of pixel data;
   a synchronization controller configured to receive the plurality of frame information data from the plurality of image controllers, and generate synchronization data for synchronizing the plurality of pixel data on the basis of the plurality of frame information data; and
   a synchronization memory configured to receive from the synchronization controller the plurality of frame information data and the synchronization data, and to store the plurality of frame information data and the synchronization data,
   wherein the synchronization controller comprises a counter configured to increase a counter value until the synchronization controller receives the plurality of frame information data, and the synchronization controller is configured to generate the synchronization data according to the counter value.

2. The frame grabber of claim 1, further comprising a processor configured to receive the plurality of frame information data and the synchronization data from the synchronization memory, receive the plurality of pixel data from the plurality of pixel-storage memories on the basis of the plurality of frame information data, and synchronize the plurality of pixel data on the basis of the synchronization data.

3. The frame grabber of claim 2,
   wherein the synchronization controller provides an interrupt signal to the processor, and
   wherein the processor receives, on the basis of the interrupt signal, the plurality of frame information data and the synchronization data stored in the synchronization memory.

4. The frame grabber of claim 2, wherein the synchronization memory sequentially stores the plurality of frame information data and the synchronization data from the synchronization controller, and provides the plurality of frame information data and the synchronization data to the processor in order in which the plurality of frame information data and the synchronization data were stored.

5. The frame grabber of claim 4, wherein the synchronization controller generates the synchronization data after elapse of a reference time since reception of the plurality of frame information data.

6. The frame grabber of claim 4, wherein the synchronization controller generates the synchronization data when the counter value is equal to or larger than a reference value.

7. The frame grabber of claim 4, wherein the synchronization controller comprises:
   a synchronization information register configured to increase a synchronization information register value when the counter value is equal to or larger than a reference value.

8. An image processing system comprising:
   a plurality of cameras configured to detect images and simultaneously generate a plurality of image signals;
   a decoder configured to generate a plurality of image data by decoding the plurality of image signals;
   an image controller configured to generate a plurality of pixel data and a plurality of frame information data comprising identification information corresponding to the plurality of pixel data on the basis of the plurality of image data, each of the plurality of pixel data corresponding to a respective camera of the plurality of cameras;
   a pixel-storage memory configured to receive, from the image controller, and store the plurality of pixel data;
   a synchronization controller configured to receive the plurality of frame information data from the image controller and to generate synchronization data for synchronizing the plurality of pixel data on the basis of the plurality of frame information data;
   a synchronization memory configured to receive, from the synchronization controller, and store the plurality of frame information data and the synchronization data; and
   a processor configured to receive the plurality of frame information data and the synchronization data from the synchronization memory, receive from the pixel-storage memory the plurality of pixel data on the basis of the plurality of frame information data, and synchronize the plurality of pixel data on the basis of the synchronization data,
   wherein the synchronization controller comprises a counter configured to increase a counter value until the synchronization controller receives the plurality of frame information data, and the synchronization controller is configured to generate the synchronization data according to the counter value.

9. The image processing system of claim 8, wherein the plurality of image signals are provided to the decoder via transfer paths having different lengths.

10. The image processing system of claim 8, further comprising a camera synchronization signal generation unit configured to provide a camera synchronization signal to the plurality of cameras and separated from the synchronization controller.

11. The image processing system of claim 8,
wherein the decoder comprises a plurality of decoders configured to decode an image signal corresponding to one of the plurality of cameras,
wherein the image controller comprises a plurality of image controllers configured to receive image data corresponding to one of the plurality of cameras, and generate pixel data and frame information data, and
wherein the pixel-storage memory comprises a plurality of memories respectively configured to store pixel data corresponding to a respective one of the plurality of cameras.

12. The image processing system of claim 11, wherein the image data comprise at least one of pixel clock data, pixel color data, a horizontal synchronization signal, or a vertical synchronization signal.

13. The image processing system of claim 11, wherein the processor determines a memory for performing a read operation among the plurality of memories on the basis of the plurality of frame information data.

14. The image processing system of claim 13, wherein the identification information comprises at least one of identification information of a camera corresponding to the memory for performing the read operation, address information of the memory, size information of pixel data stored in the memory, or display area information of the pixel data.

15. An image processing method comprising:
receiving, by a frame grabber, a plurality of image signals from a plurality of cameras, respectively;
generating, by the frame grabber, a plurality of image data on the basis of the plurality of image signals;
generating, by the frame grabber, a plurality of pixel data and a plurality of frame information data comprising identification information corresponding to the plurality of pixel data on the basis of the plurality of image data, each of the plurality of pixel data corresponding to a respective camera of the plurality of cameras;
storing, by the frame grabber, the plurality of pixel data;
generating, by the frame grabber, synchronization data for synchronizing the plurality of pixel data on the basis of the plurality of frame information data; and
receiving, by a processor, the plurality of pixel data on the basis of the plurality of frame information data and synchronizing the plurality of pixel data on the basis of the synchronization data,
wherein generating the synchronization data comprises increasing a counter value until a synchronization controller receives the plurality of frame information data and generating the synchronization data according to the counter value.

16. The image processing method of claim 15, wherein the generating the synchronization data further comprises:
resetting the counter value when the synchronization controller receives the plurality of frame information data; and
providing the synchronization data to a synchronization memory when the counter value is equal to or larger than a reference value.

17. The image processing method of claim 15, wherein the generating the synchronization data further comprises:
providing, to a synchronization memory, the synchronization data comprising counter information corresponding to the counter value when the synchronization controller receives the plurality of frame information data; and
resetting the counter value.

18. The image processing method of claim 15, wherein the generating the synchronization data further comprises:
generating the synchronization data comprising register information corresponding to a synchronization information register value when the synchronization controller receives the plurality of frame information data; and
increasing the synchronization information register value when the counter value is equal to or larger than a reference value.

* * * * *